United States Patent [19]

Mild

[11] 4,118,076
[45] Oct. 3, 1978

[54] CONTROL VALVE HAVING REDUCED CRACK-OPEN PRESSURE

[75] Inventor: William M. Mild, Maryland Heights, Mo.

[73] Assignee: Wagner Electric Corporation, St. Louis, Mo.

[21] Appl. No.: 781,835

[22] Filed: Mar. 28, 1977

[51] Int. Cl.² .............................................. B60T 8/26
[52] U.S. Cl. .................................. 303/6 C; 188/349; 303/28
[58] Field of Search ............................ 303/6 C, 28–30, 303/40, 50, 52, 118, 84, 54, 6 R, 6 A; 188/349; 137/627.5, 596.18, 102

[56] References Cited

U.S. PATENT DOCUMENTS

| 3,770,019 | 11/1973 | Stelzer | 303/40 X |
| 3,771,836 | 11/1973 | Bueler | 303/6 C |
| 3,776,602 | 12/1973 | Bueler | 188/349 X |

*Primary Examiner*—Trygve M. Blix
*Assistant Examiner*—Douglas C. Butler

*Attorney, Agent, or Firm*—Eyre, Mann, Lucas & Just

[57] ABSTRACT

A control valve having relay and proportioning pistons has an intermediate piston which controls air pressure access to a blind flow chamber. At a relatively low value of control air pressure, the intermediate piston is shuttled into a position which closes and traps the existing value of control air pressure in the blind flow chamber. The trapped constant value of air pressure in the blind flow chamber operates on a larger area piston whose force is added to the forces derived from further increases in control air pressure to provide a first region of output air pressure having incremental increases smaller than the input. When the input air pressure reaches a certain value, a second region of output air pressure is reached where further increases in input air pressure cause metered addition to the air pressure in the blind flow chamber and thus produces incremental output increases greater than incremental input increases. At a high value of input air pressure, a third region is reached in which output and input air pressures become and remain equal.

15 Claims, 2 Drawing Figures

CONTROL VALVE HAVING REDUCED CRACK-OPEN PRESSURE

Background of the Invention

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generting potential were provided on the vehicle, the aforementioned redistribution of front to rear axle braking effort effected during rather high vehicle decelerations resulted in the following undesirable or disadvantageous features: (1) an increasing tendency for early front wheel skidding; (2) a deleterious effect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

Proportioning valves are known in the art which restrict the pressure delivered to front brakes over a low brake application pressure range in order to allow the development of sufficient rear-wheel braking torque to effect a significant load shift to the front wheels. For example, U.S. Pat. No. 3,771,836 teaches a brake proportioning valve having three pressure ranges: (a) a low-pressure range where the pressure delivered to the front brakes is lower than that delivered to the rear brakes: (b) an intermediate pressure range where the front-brake pressure increases faster than the rear; and (c) a high pressure range of equal front-rear pressures. This prior-art proportioning valve has the undesirable attribute that it provides no output until a certain input air pressure, called the "crack-open pressure" is attained. Thus, in mild stops, the unaffected rear brakes are consistently applied before the front brakes may begin. This results in greater rear brake and tire wear.

SUMMARY OF THE INVENTION

The present invention teaches a control valve having a differential piston within it. In response to variations in control fluid pressure, the control valve provides output fluid pressure in three proportionate pressure regions. To overcome the undesirable effects of high crack-open pressure, the present invention has a helper piston of large area which initially causes the proportioning action to begin at a lower input air pressure.

Once the helper piston has achieved the desired reduction in crack-open pressure, a valve isolates the helper piston from further increases in control air pressure while trapping the existing value of control air pressure in a blind flow chamber on one side of the helper piston. The force derived from the trapped air pressure is a constant additive to the force derived from further increases in the control air pressure. This condition defines the first proportionate pressure region. Increases in control air pressure produce increases in output air pressure that are proportionately less than those of the control air pressure.

At an intermediate value of control air pressure, a proportioning valve begins admitting additional air pressure to the amount trapped in the blind flow chamber behind the helper piston. This condition defines the second proportionate pressure region. Due to the increasing effectiveness of the helper piston, increases in control air pressure produce proportionately greater increases in output air pressure.

At a high value of control air pressure, the full value of control air pressure is admitted to the helper piston. This condition defines the third proportionate pressure region. Due to the full effective area of the helper piston being operative in this pressure region, the output air pressure is approximately equal to the input air pressure.

DETAILED DESCRIPTION OF THE PREFERRED EMBODIMENT

Figure 1:
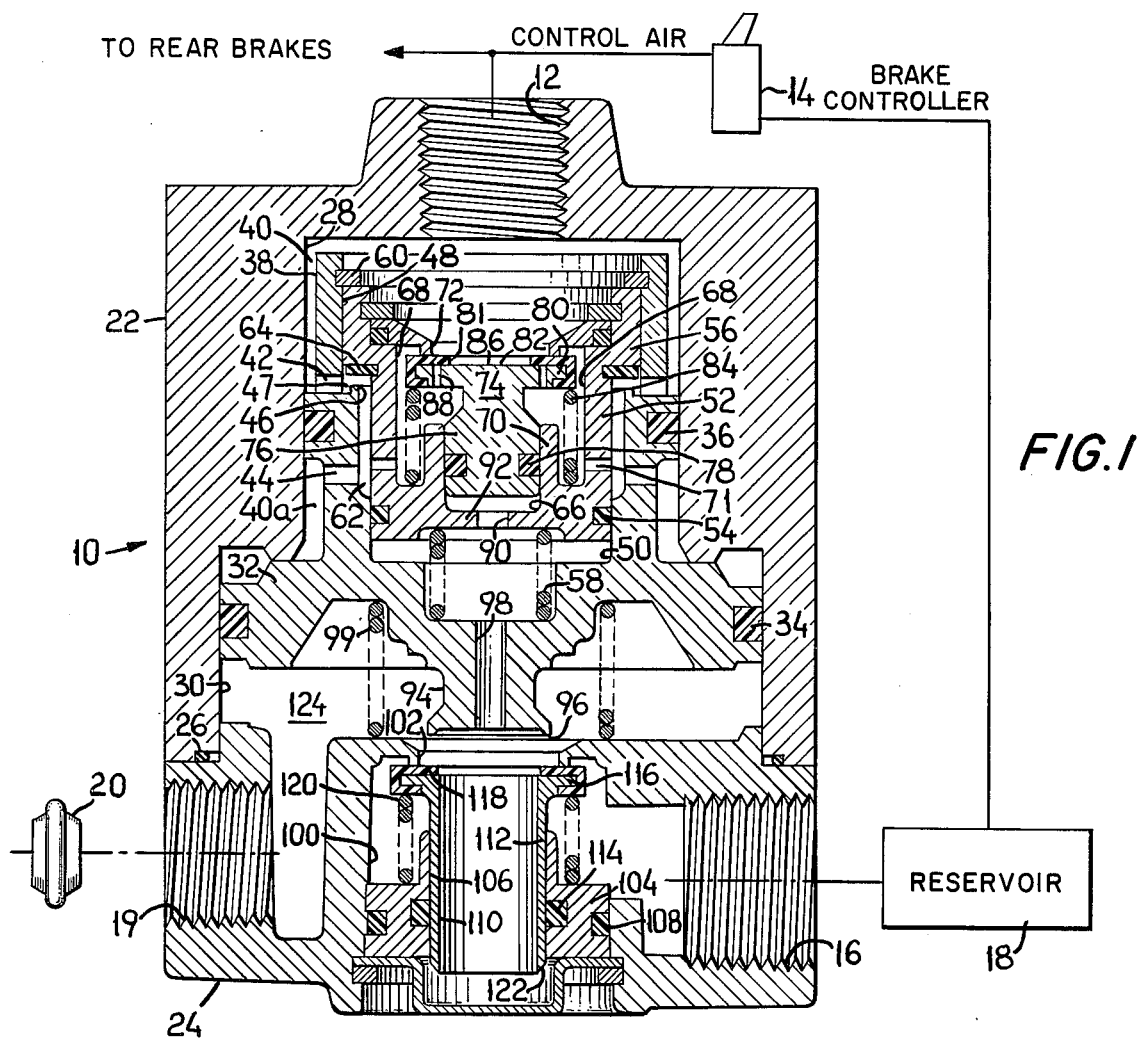
FIG. 1 shows a longitudinal cross section of the control valve which forms the subject matter of the present invention as well as a schematic representation of its functional location in a brake system.

Referring to FIG. 1, an air relay valve 10 receives variable control air pressure at a control air inlet 12 from a brake controller 14, such as a foot pedal. The air relay valve 10 receives air pressure at a pressure inlet 16 from an air pressure reservoir 18. The air relay valve 10 provides metered application of air pressure through a pressure outlet 19 to a vehicle brake 20 in variable proportionate response to the magnitude of the control air pressure at control air inlet 12.

The air relay valve 10 is composed of an upper body 22 and a lower body 24 hermetically sealed together by a resilient ring 26. The upper body 22 contains a stepped cylindrical bore having a smaller diameter 28 nearer the control air inlet 12 and a larger diameter 30 nearer the lower body 24. A two-area, or differential, piston 32 is sealably fitted within the stepped bore. The two-area piston 32 has a larger-area piston ring 34 in sealing contact with the larger diameter 30 and a smaller-area piston ring 36 in an intermediate location of the upper portion 38 of the two-area piston 32 in sealing contact with the smaller diameter 28. The diameter of the upper portion 38 of the two-area piston 32 is smaller than the smaller diameter 28 of the stepped bore, thus leaving an annular upper flow passage 40 and lower flow passage 40a above and below respectively the smaller-area piston ring 36.

A plurality of upper transverse bores 42 communicate through the upper portion 38 of the two-area piston 32 above the smaller area piston ring 36. A plurality of lower transverse bores 44 communicate through the upper portion 38 of the two-area piston 32 below the smaller area piston ring 36. An annular ridge 46 on the inside of the upper portion 38 between the upper and lower transverse bores 42, 44 forms an upward-directed annular valve seat 47.

The two-area piston 32 contains an intermediate stepped bore within it. A larger intermediate diameter 48 and a smaller intermediate diameter 50 of the intermediate stepped bore are separated by the annular ridge 46.

An intermediate piston 52 is fitted into the intermediate stepped bore with a sealing engagement between an intermediate piston ring 54 and the smaller intermediate diameter 50. A guiding and non-sealing engagement is provided between a guide bushing 56 and the larger intermediate diameter 48. A spring 58, biased between two-area piston 32 and intermediate piston 52, urges intermediate piston 52 upward. The upward travel of the intermediate piston is limited by snap ring 60 in the larger intermediate diameter 48.

The intermediate piston 52 is spaced away from the two-area piston 32 in the region between the upper and lower transverse bores 42, 44 thus creating an intermediate flow chamber 62. A radially directed resilient ring 64 attached to the outer perimeter of the intermediate piston 52 overhangs the upward-directed annular valve seat 47 on the two-area piston 32.

The intermediate piston 52 contains an inner cylindrical bore 66 and an outer cylindrical bore 68 separated by an annular wall 70. An intermediate transverse bore 71 provides open fluid communication between the intermediate flow chamber 62 and the outer cylindrical bore 68. An annular lip 72 overhangs the outer cylindrical bore 68.

A proportioning piston 74 is fitted inside the intermediate piston 52. The proportioning piston 74 has a lower cylindrical body 76 which is guidingly contained in the inner cylindrical bore 66. A resilient ring 78 about the lower cylindrical body 76 seals the inner cylindrical bore 66. The proportioning piston 74 has an upper flange 80 which contains an annular ring of resilient gasket 81 on its flat upper surface 82. A spring 84, biased between the intermediate piston 52 and the bottom of the upper flange 80 urges the resilient gasket 81 upward into sealing contact with the overhanging annular lip 72.

The resilient gasket 81 has a central opening 86 inside the annular point of contact with the annular lip 72. A plurality of relief channels 88 pass in the axial direction through the upper flange 80 emerging in the region of the flat upper surface 82 covered by the resilient gasket 81. The resilient gasket 81 operates in the nature of a check valve by sealing the relief channels 88 against downward flow of pressure while allowing relatively unretarded upward flow. The significance of this function is explained in the section on operation.

An intermediate atmospheric channel 90 provides communication through the axis of the base wall 92 of the inner cylindrical bore 66.

A coaxial piston extension 94 extends coaxially downward from the two-area piston 32. The coaxial piston extension 94 has a downward-directed annular ridge 96 about its perimeter. An axial atmospheric channel 98 extends axially through the coaxial piston extension 94. A spring 99 urges the two-area piston 32 in the upward direction.

The lower body 24 contains an axial vertical bore 100 terminating at its upper end in an annular overhanging ridge 102. A guide 104 containing an axial bore 106 is fitted into the axial bore 100 and sealed with a gasket 108. A control valve member 110 having a hollow tubular shaft 112 is slidingly fitted into the axial bore 104 and the mating surfaces are sealed against leakage by a resilient ring 114. A radially directed flange 116, having a resilient valve seat 118 on its upper surface is connected to the upper end of the hollow tubular shaft 112. A spring 120, biased between the guide 104 and the bottom of the radially directed flange 116, urges the valve seat 118 into sealing engagement with the annular overhanging ridge 102. The hollow tubular shaft 112, open to the atmosphere at its lower end 122, forms an exhaust port.

A delivery chamber 124 is associaed with the pressure outlet 19. When the annular ridge 96 is disengaged from the valve seat 118 as shown, atmospheric air pressure is admitted through the hollow tubular shaft 112 into the delivery chamber 124 and thence through the pressure outlet 19 to the brake 20.

OPERATION

In the quiescent brakes-off condition shown in the figure, atmospheric-pressure air fills all areas of the valve except the pressure inlet 16 and the connected volume below the radially directed flange 116.

When pressurized air is initially admitted through the control air inlet 12, the inlet control pressure passes through the upper flow passage 40, the upper transverse bore 42 and the intermediate flow passage 62, outward through the lower transverse bore 44 and into the lower flow passage 40a to operate across the area defined by the smaller-area piston ring 36 and across the larger area defined by larger-area piston ring 34.

Due to the large effective area of the combined pistons being subjected to control air pressure, the entire nested assembly of pistons consisting of two-area piston 32, intermediate piston 52 and proportioning piston 74 move downward as a unit against the opposing force of spring 99 at a low value of control air pressure. The annular ridge 96 is lowered into sealing contact with the valve seat 118.

At a slightly higher control air pressure, the bias force of spring 120 is barely overcome. The control air pressure at which the combined bias forces of springs 99 and 120 are overcome is called the crack-open pressure. At a control air pressure $P_n$ approximately equal to the crack-open pressure, the control air pressure acting across the area defined by intermediate piston ring 54 is sufficient to shuttle intermediate piston 52 downward against the force of spring 58. Radially directed resilient ring 64 is forced into sealing contact with upward-directed annular valve seat 47. Intermediate flow channel 62, lower flow channel 40a and the volume inside the inner cylindrical bore 68 are thus isolated from further increases in control air pressure. An air pressure equal to the control air pressure $P_n$ at which the shuttling took place is trapped in these enumerated volumes. The downward force due to the trapped air at pressure $P_n$ acting on the area defined by larger-area piston ring 34 minus the area defined by smaller-area piston ring 36 is linearly summed with the force developed by the instantaneous value of control air pressure acting over the area defined by the smaller-area piston ring 36. The augmentation derived from the trapped pressure $P_n$ continues over a region of higher control air pressure until increased or relieved as will be explained.

Above the crack-open pressure, the increases in control air pressure acting across the effective area of smaller-area piston ring 36, augmented by the fixed value of trapped air pressure tend to urge the nested piston assembly downward against the combined resisting forces of springs 99 and 120. The annular ridge 96 thus presses downward on valve seat 118. Valve seat 118 is moved out of sealing contact with annular overhanging ridge 102. A metered amount of reservoir pressure air from vertical bore 100 passes into the delivery chamber 124. Air pressure in the delivery chamber 124 acts upwardly over the area defined by larger-area piston ring 34 minus the area defined by the annular contact of annular ridge 96 on valve seat 118 to resist the downward force provided by the control air pressure. The upward force required to balance the downward force is achieved at a lower air pressure in the delivery chamber 124 than the air pressure at the control air inlet. This is the result of the fact that the effective piston area presented to the air pressure in the delivery chamber 124 acting upward is greater than that presented to the control air pressure acting downward. When equilibrium pressure is attained in the delivery chamber 124, sealing contact is reestablished between the valve seat 118 and the annular overhanging ridge 102 thus halting the increase in air pressure in the delivery chamber 124 before it rises as high as the control air pressure. Subsequent increases in control air pressure cause the process just described to be repeated; with the pressure increase in the delivery chamber lagging further and further behind the control air pressure.

Figure 2:
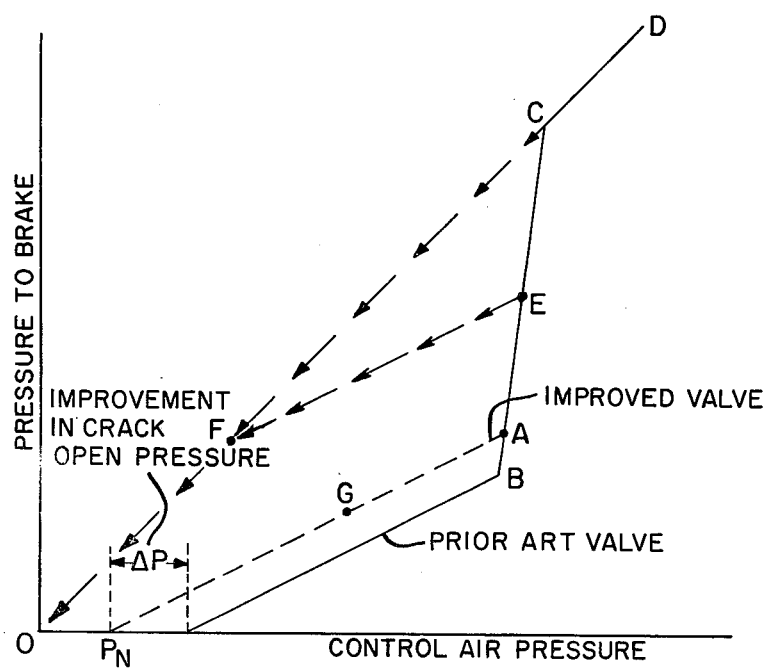
FIG. 2 shows the input-output pressure relationships of the control valve of the present invention.

The relationship between control air pressure and the air pressure delivered to the brake by the prior art and by the present invention is shown in FIG. 2. The improved valve, shown by the dashed line, has a crack-open pressure $P_n$ which is lower than the crack-open pressure of the unimproved valve, shown in the solid line, by an increment $\Delta P$. In one embodiment reduced to practice, the applicant has reduced the crack-open pressure by 50 percent. At the control air pressure shown at A in the curve, the control air pressure acting across the piston area defined by the mating of annular lip 72 with the resilient gasket 81 is just sufficient to overcome the opposing force of spring 84 and the trapped air pressure in the outer cylindrical bore 68. A metered amount of air pressure is admitted past the resilient gasket 81 into the intermediate flow chamber 62, through the lower transverse bores 44 and into the lower flow passage 40a where it adds to trapped air pressure $P_n$. The metering of air pressure past the gasket 81 continues until a new equilibrium is attained between the downward pressure across the mating area of annular lip 72 and the upward forces including the spring 84 and the increased air pressure in the outer cylindrical bore 68. The increased air pressure in lower flow passage 40a acts on the area defined by large-area piston ring 34 to increase the downward force of the set of nested pistons thus requiring a proportionate increase in air pressure in the delivery chamber to counterbalance it. Thus the curve in FIG. 2 follows the steeply rising portion from A to C. This corresponds to the curve B to C for the prior art valve.

At and above point C in FIG. 2 downward force on the proportionating piston 74 due to the control air pressure acting across the area defined by resilient ring 78, is sufficient to hold the resilient gasket 81 fully disengaged from the annular lip 72. Thus, beyond point C, the full value of control air pressure is admitted to the lower flow passage 40a where it is available to act across the area defined by the larger-area piston ring 34. In this region, the air pressure acting on one side of the larger-area piston ring 34 in the delivery chamber must approximately match the air pressure acting over approximately the same area on the other side of larger-area piston ring 34. The effective areas differ by the small area defined by annular ridge 96. Thus air pressure to the brake remains approximately equal to the control air pressure in the region CD as indicated by the 45° line in this region.

When the control air pressure is decreased in the region CD, the brake air pressure is proportionately decreased by the net upward force on the nested set of pistons, thus raising annular ridge 96 out of sealing contact with valve seat 118. The air pressure in the delivery chamber 124 is metered to the atmosphere through tubular shaft 112 until a new equilibrium pressure in the delivery chamber 124 equal to the control air pressure is attained.

As the control air pressure is reduced to point C, the net upward forces on proportioning piston 74 move the resilient gasket 81 into contact with annular lip 72. Further reductions in control air pressure are vented from the region below the upper flange 80 of the proportioning piston 74 by the undirectional valve action of the resilient gasket 81 overlaying the plurality of relief channels 88. Thus for reductions in control air pressure in the region from C to O, the air pressure below the upper flange 80 remains approximately equal to the control air pressure. The release line from a point on the line CD follows the arrows CO in which brake air pressure remains equal to control air pressure. At control air pressure $P_n$, intermediate piston 52 is forced upward by spring 58 therebye causing ring 64 to break sealing contact with seat 47.

A different action occurs if brake release is performed from a control air pressure on the steep line AC, for example at point E. At point E, the control air pressure above the proportioning piston 74 exceeds the air pressure in the outer cylindrical bore 68 below it. Consequently, no check-valve action takes place initially. Decreases in control air pressure cause the brake air pressure to decrease along the line EF, parallel to the line $P_nA$, until it intersects the 45° line CO at point F. At point F, control air pressure and brake air pressure are equal. The check-valve action of resilient gasket 81 thereafter enables further pressure reduction to follow the line FO. The vertical distance between the parallel lines EF and $P_nA$ is equal to the difference between the trapped air pressure at point E and the trapped air pressure $P_n$ acting over the same effective area.

By a similar analysis, it is apparent that a decrease in control air pressure while on the shallow curve $P_nA$ as, for example, point G, will follow the curve $P_nA$.

It will be understood that the claims are intended to cover all changes and modifications of the preferred embodiments of the invention, herein chosen for the purpose of illustration which do not constitute departures from the spirit and scope of the invention.

What is claimed is:

1. A control valve comprising:
   (a) a housing;
   (b) said housing being adapted to receive control fluid pressure at a first inlet, fluid pressure at a second inlet and providing brake fluid pressure at an outlet thereof;
   (c) control valve means moveable in said housing for controlling the application therethrough of fluid pressure from said second inlet to said outlet upon receipt at said first inlet of control fluid pressure;
   (d) differential piston means within said housing, said differential piston means having larger and smaller piston areas in sealing contact with larger and smaller bores in said housing;
   (e) means for freely communicating control fluid pressure to said larger piston area at fluid pressures between atmospheric pressure and a first level of control fluid pressure greater than atmospheric pressure;
   (f) means for isolating said larger piston area from said control fluid pressure upon the occurrence of said first level of control fluid pressure, whereby a fixed value of fluid pressure equal to said first level is trapped between said larger and smaller piston areas;
   (g) means for providing brake fluid pressure in a first predetermined ratio to said control fluid pressure for control fluid pressure between said first and a second, higher level of control fluid pressure; and
   (h) means for admitting control fluid pressure in metered amounts between said larger and smaller piston areas at greater than said second level of control fluid pressure higher than said first level of control fluid pressure, whereby brake fluid pressure is provided in a second predetermined ratio higher than said first predetermined ratio.

2. A control valve comprising:
   (a) a housing;
   (b) said housing being adapted to receive control fluid pressure at a first inlet, fluid pressure at a second inlet and providing brake fluid pressure at an outlet thereof;
   (c) control valve means moveable in said housing for controlling the application therethrough of fluid pressure from said second inlet to said outlet upon receipt at said first inlet of control fluid pressure;
   (d) differential piston means within said housing, said differential piston means having larger and smaller piston areas in sealing contact with larger and smaller bores in said housing;
   (e) means for admitting control fluid pressure to said larger piston area at fluid pressure between atmospheric pressure and a first level of control fluid pressure greater than atmospheric pressure;
   (f) means for isolating said larger piston area from said control fluid pressure upon the occurrence of said first level of control fluid pressure, whereby a fixed value of fluid pressure equal to said first level is trapped between said larger and smaller piston areas;
   (g) means for providing brake fluid pressure in a first predetermined ratio to said control fluid pressure for control fluid pressure between said first and a second, higher level of control fluid pressure; and
   (h) means for admitting control fluid pressure in metered amounts between said larger and smaller piston areas at greater than said second level of control fluid pressure higher than said first level of control fluid pressure, whereby brake fluid pressure is provided in a second predetermined ratio higher than said first predetermined ratio, said means for isolating comprises:
      (i) an intermediate bore within said differential piston means;
      (ii) an intermediate piston in sealing relationship within said intermediate bore;
      (iii) upper and lower flow passage means in bypass relationship to said smaller piston area;
      (iv) first valve means on said differential piston means between said upper and lower flow passages;
      (v) second valve means on said intermediate piston, said second valve means being axially aligned with said first valve means;
      (vi) said intermediate piston having first and second positions;
      (vii) a spring urging said intermediate piston into its first position;
      (viii) said intermediate piston being urged into its second position by the force of fluid pressure across the effective area of the intermediate piston; and
      (ix) said first and second valve means being in sealing contact when said intermediate piston is in its second position; whereby said upper and lower flow passages are isolated from each other.

3. The control valve recited in claim 2 further comprising:
   (a) an inner bore within said intermediate piston;
   (b) a proportioning piston sealingly engaged within said inner bore, said proportioning piston having first and second positions;
   (c) third valve means on said intermediate piston;
   (d) fourth valve means on said proportioning piston;
   (e) said third and fourth valve means being axially aligned;
   (f) said third and fourth valve means being sealingly engaged when said proportioning piston is in its first position and disengaged when in its second position;
   (g) a spring urging said proportioning piston into its first position;
   (h) an inner flow passage between said intermediate and proportioning pistons; and
   (i) an intermediate transverse bore providing open fluid communication between said inner flow passage and said lower flow passage.

4. The control valve recited in claim 3 further comprising a unidirectional valve between said inner flow passage and said first inlet.

5. A control valve comprising:
   (a) a housing;
   (b) a fluid pressure inlet in said housing;
   (c) a fluid pressure outlet in said housing;
   (d) a control fluid pressure inlet in said housing;
   (e) first valve means in said housing for controlling the flow of fluid pressure from said fluid pressure inlet to, and exhausting fluid from, said fluid pressure outlet upon the connection thereto and exhaustion of control fluid pressure;
   (f) larger and smaller bores in said housing;
   (g) a differential piston in said housing having larger and smaller piston rings in sealing engagement with said larger and smaller bores;

(h) upper and lower flow chambers in bypass relationship to said smaller piston ring;
(i) first valve means for freely communicating control fluid pressure to said lower flow chamber at control fluid pressure between atmospheric pressure and a predetermined fixed level greater than atmospheric pressure and for isolating said lower flow chamber from said upper flow chamber upon the occurrence of said first predetermined level of control fluid pressure greater than atmospheric pressure and trapping a fixed value of fluid pressure equal to said first predetermined level therein during the increase of control fluid pressure to a second, higher fluid pressure; and
(j) second valve means for admitting metered additional amounts of control fluid pressure to said lower flow chamber at and above said second higher level of control fluid pressure.

6. The control valve recited in claim 5 further comprising unidirectional valve means for relieving fluid pressure from said lower flow chamber to said fluid inlet.

7. A control valve comprising:
(a) a housing;
(b) a fluid pressure inlet in said housing;
(c) a fluid pressure outlet in said housing;
(d) a control fluid pressure inlet in said housing;
(e) first valve means in said housing for controlling the flow of fluid pressure from said fluid pressure inlet to and exhausting fluid from said fluid pressure outlet upon the connection thereto and exhaustion of control fluid pressure;
(f) first piston means operative upon the occurrence of a first level of control fluid pressure for shuttling said first valve means into its operative position;
(g) second piston means for actuating said first valve means in a first region of control fluid pressure between said first level and a second higher pressure level, whereby outlet fluid pressure is provided in a first ratio to inlet fluid pressure;
(h) means for isolating said first piston means from further increases in control fluid pressure and trapping the first level of pressure in a region between said first and second piston means;
(i) means for adding the force from said trapped fluid pressure to the force actuating said first valve means;
(j) second valve means for admitting increased fluid pressure to said first piston means in a second region of control fluid pressure between said second level and a third, higher, level; and
(k) the force derived from said increased fluid pressure on said first piston means being additive to said second piston means, whereby outlet fluid pressure is provided in a second, higher, ratio to inlet fluid pressure.

8. A relay control valve comprising:
(a) a housing
(b) a fluid pressure inlet in said housing;
(c) a fluid pressure outlet from said housing;
(d) a control fluid pressure port in said housing;
(e) relay valve means in said housing for metering fluid pressure from said fluid pressure inlet to said fluid pressure outlet in response to the control fluid pressure at said control fluid port;
(f) control piston means for controlling said relay valve means;

(g) intermediate piston means nested in said control piston means for trapping a first fixed predetermined control fluid pressure greater than zero during increases in control fluid pressure from said first fixed predetermined control fluid pressure to a second higher fixed predetermined fluid pressure, the trapped fluid pressure being operative to reduce the crack-open pressure; and
(h) proportioning valve means nested in said intermediate piston means for adding additional metered fluid pressure to the trapped fluid pressure at control fluid pressures greater than said second fixed predetermined control fluid pressure.

9. A relay control valve comprising:
(a) a housing;
(b) a fluid pressure inlet in said housing;
(c) a fluid pressure outlet in said housing;
(d) a control fluid pressure port in said housing;
(e) control valve means in said housing for metering fluid pressure from said fluid pressure inlet to said fluid pressure outlet;
(f) control piston means in said housing for operating said control valve means;
(g) second piston means for controlling the admission of control fluid pressure to at least part of said control piston means; and
(h) proportioning piston means distinct from said second piston means for controlling the admission of control fluid pressure to at least part of said control piston means.

10. The apparatus recited in claim 9 wherein said second piston means is nested within said control piston means.

11. The apparatus recited in claim 9 further comprising:
(a) said second piston means having valve means for trapping a fixed fluid pressure greater than atmospheric pressure in said control piston means; and
(b) the trapped pressure being effective to reduce the crack-open pressure.

12. The apparatus recited in claim 11 further comprising: said fixed fluid pressure remaining constant for increases in control fluid pressure from said fixed fluid pressure greater than zero to a second control fluid pressure higher than said fixed fluid pressure.

13. The apparatus recited in claim 12 further comprising said proportioning piston means being operative above said second control fluid pressure to add a metered proportion of said control fluid pressure to the trapped fluid pressure.

14. A relay control valve comprising:
(a) a housing;
(b) a fluid pressure inlet in said housing;
(c) a fluid pressure outlet from said housing;
(d) a control fluid pressure port in said housing;
(e) control valve means in said housing for metering fluid pressure from said fluid pressure inlet to said fluid pressure outlet;
(f) control piston means in said housing for operating said control valve means;
(g) second piston means for controlling the admission of control fluid pressure to at least part of said control piston means;
(h) proportioning piston means for controlling the admission of control fluid pressure to at least part of said control piston means;
(i) said second piston means being nested within said control piston means; and (j) said proportioning piston means being nested within said second piston means.

15. In a relay control valve of the type having a housing, fluid pressure inlet, a fluid pressure outlet, a control fluid pressure port, application means moveable in said housing for controlling the application therethrough of fluid pressure between said fluid pressure inlet and fluid pressure outlet, said application means having first and second pressure responsive areas responsive to the application of control fluid pressure, said first pressure responsive area being larger than the second pressure responsive area, means for freely applying control fluid pressure between atmospheric pressure and a first predetermined fluid pressure higher than atmospheric pressure to said first and second pressure responsive areas, means for isolating said first pressure responsive area from increases in control fluid pressure for control fluid pressures between said first predetermined fluid pressure and a second higher predetermined fluid pressure, and modulating means for proportionately admitting additional fluid pressure to said first pressure responsive area at control fluid pressures in excess of said second predetermined control fluid pressure.

* * * * *